Patented Jan. 8, 1929.

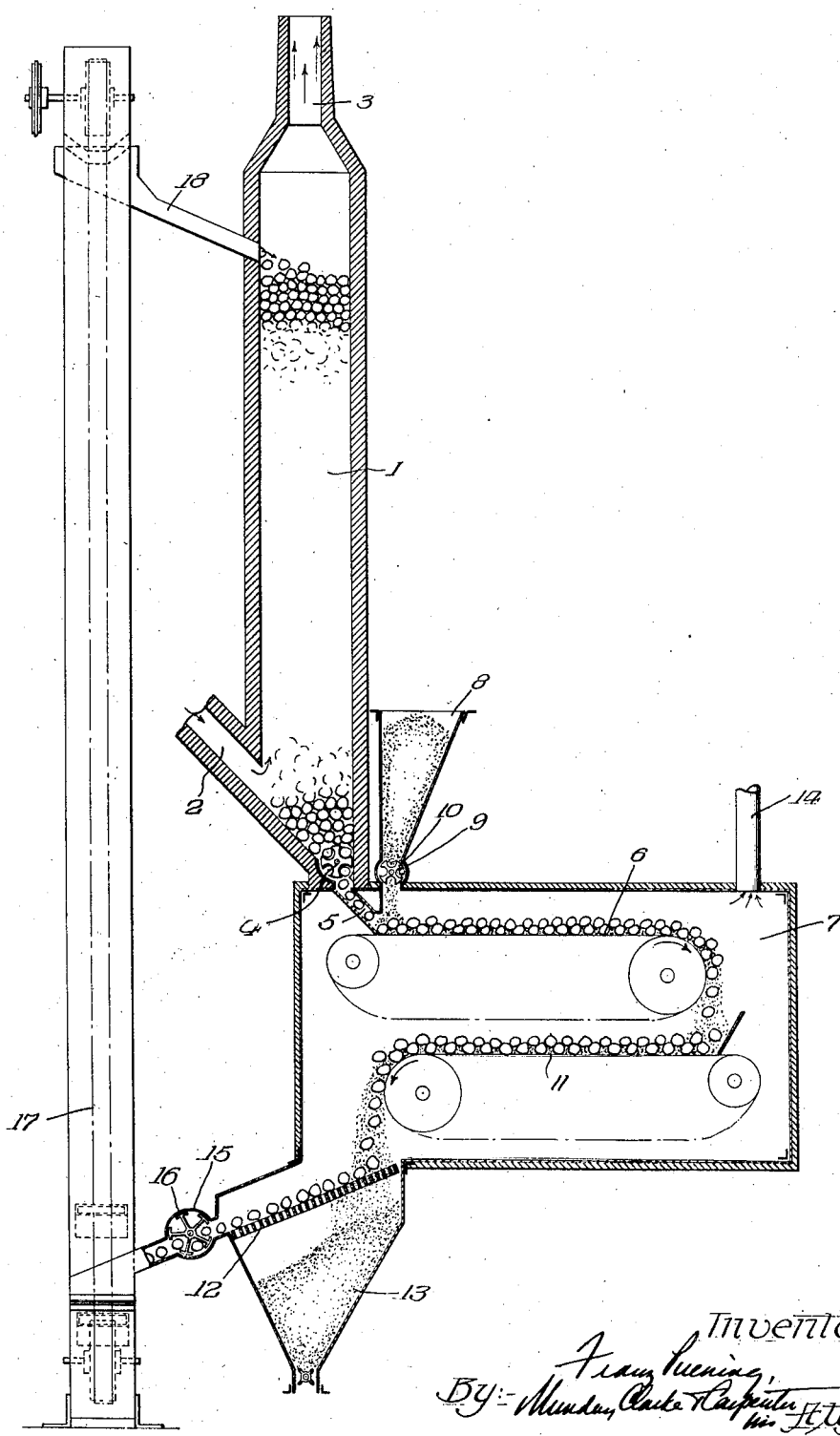

1,698,345

UNITED STATES PATENT OFFICE.

FRANZ PUENING, OF PITTSBURGH, PENNSYLVANIA.

ART OF DISTILLING CARBONACEOUS MATERIALS.

Application filed February 11, 1922. Serial No. 535,790.

This invention relates to the art of distilling carbonaceous material, such as lignite, shale, peat or bituminous coal. An object of the invention is to effect the distillation of such material at low temperatures, with a rapid transfer of the distilling heat to the material being distilled, and without any necessity for employing the expensive heating surfaces heretofore required because of the slow and inefficient heat transfer of prior low temperature distillation practice. The invention therefore, provides an entirely satisfactory low temperature distillation, and yet eliminates expensive retort constructions, with their attendant high cost of maintenance.

In addition to the general objects recited above, the invention has for further objects such other improvements and advantages in operation and results as may be found to obtain in the processes or apparatus hereinafter described or claimed.

In the accompanying drawing forming a part of this specification and showing, for purposes of exemplification, one form of apparatus for carrying out the improved low temperature distillation of the present invention, but without limiting the claimed invention specifically to such illustrative instance:

The figure illustrates a diagrammatic representation of apparatus suitable for practicing low temperature distillation of materials according to the present invention.

In its present embodiment, the invention is applied to the low temperature distillation of bituminous coal. For convenience, the ensuing description will be confined to this application of the invention. The novel features and improvements of the invention are, however, applicable to the distillation of other carbonaceous material, for example, to any of the other materials hereinabove mentioned; hence, the scope of the invention is not confined to the specific use and specific embodiment herein described as an illustrative example.

In carrying out the invention, there are employed, as the medium for effecting the transfer of the distilling heat to the material to be distilled, small bodies of a substance of high enough heat conductivity to effect a rapid transfer of the distilling heat to the material to be distilled. It is preferable, however, to employ metal heat transfer bodies, iron, in any one of its several forms, being especially suitable because of its great specific weight, its high heat conductivity, its good wearing qualities, its resistance to deterioration when subjected to rapid temperature changes and the influence of hot gases, and lastly, because of its cheapness. The invention, however, is not limited to the employment of iron as the material for the heat transfer bodies. In form, the heat transfer bodies may be in the shape of bricks, pebbles, balls, slabs, plates, cubes, or any other form or shape as may be best suitable to meet the exigencies of the commercial practice of the invention.

These heat transfer bodies are exposed to the action of hot gases to store in them the heat which is subsequently employed for effecting the distillation of the material. Any hot gases may be employed, provided that they are not of such a nature as to readily injure the heat transfer bodies. In any case, the temperature to which the heat transfer bodies may be heated is limited by the resistance of the material of which they are composed to oxidize or be otherwise impaired at high temperatures. In case iron is employed, however, the bodies may be heated to a temperature of about 1400° F. in an atmosphere of well burned gases, without unduly exposing the iron to deterioration.

With iron heat transfer bodies heated to a surface temperature of 1400° F., distillation of the coal may be effected by bringing the coal into direct contact with such hot heat transfer bodies. The coal to be distilled may be either at ordinary atmospheric temperature, prior to the time of contact with the heat transfer bodies, or may be preheated, if desired. At the moment of contact, coal quickly absorbs the peak of the heat stored in the surface of the heat transfer body and in the portions of such body just below its surface. The particles of the coal in contact with the heat transfer bodies are thus rapidly heated, the heat penetrating into the interior of the coal. During the heating up stage, a dry skin of coke is formed on the coal, thereby permitting ready separation of the coal from the heat transfer bodies at the completion of the distillation operation. As the heat transfer from the bodies to the coal progresses, the flow of heat into the coal diminishes in rate, along with the approach of the coal and the heat transfer bodies into an equilibrium of temperature. In order to avoid an impractical slowing up of the heat transfer, after the initial rapid heat absorption by the coal, the weight of the heat transfer bodies employed, with respect to the coal being distilled, is regulated so that the storage capacity for heat of the heat transfer bodies is in excess of the heat required to bring the coal to the required final temperature. The final temperature varies, of course, with different coals and with the other materials available for treatment by the distillation process of the invention. For many of such materials, however, a satisfactory final temperature is approximately a thousand degrees F. and the process of low temperature distillation would be completed at that temperature. It requires about 400 B. t. u. per pound of material, in order to heat commercial grades of bituminous coal to a final temperature of a thousand degrees F. In order to attain such a final temperature, a maximum temperature drop of the iron heat transfer bodies from 1400° F. to a thousand degrees F. is available. Between 1400° F. and a thousand degrees F., iron, for example, has a specific heat of approximately 0.148. Therefore, (1400−1000)×0.148=59 B. t. u. are freed for absorption by the coal, when one pound of iron drops from 1400° F. to a thousand degrees F. Inasmuch as 400 B. t. u. are required for one pound of coal, 400 divided by 59 equals 6.77 pounds of iron which are required to furnish sufficient heat for elevating one pound of coal to a final temperature of approximately 1,000° F. In order to compensate for the slowing down of the heat transfer, as above explained, it is preferable to employ approximately twice as much iron as the theoretical minimum, which would be approximately 14 pounds of iron for each pound of coal to be distilled. The far greater weight of iron per unit volume as compared with the same volume of coal makes the relative volumes of the two materials quite capable of being handled practically. For example, bituminous coal weighs approximately 50 pounds per cubic foot. One square foot of coal of one inch thickness would therefore weigh only 4.17 pounds. This coal might be brought into contact with a square foot of hot iron, the latter weighing fourteen times as much as the coal or a total of 58.2 pounds. An iron plate one foot square of the same weight has an approximate thickness of only one and one-half inches.

By preheating the coal or drying it before bringing the coal into contact with the hot iron, the amount of heat required for the distillation process may be materially reduced. This would permit the process to be carried on with a smaller quantity of iron. Even when preheating of the coal is employed, it is preferable to employ enough iron in order that the heat available for distillation be about twice the amount of the theoretical minimum.

Referring to the drawing: The iron heat transfer bodies may be heated up in the furnace 1. The gases employed for heating the iron bodies enter the furnace through inlet 2 at the bottom and discharge from the top of the furnace through the stack 3. The furnace 1 may be any chamber in which the iron heat transfer bodies are subjected to the direct heating effect of the gases, and in said furnace the bodies are heated to a temperature of approximately 1400° F. The heated iron bodies discharge from the bottom of the furnace 1, being fed by the rotary discharger 4 through a conduit 5 which carries and deposits said bodies onto the upper reach of a traveling belt conveyor 6. The conveyor 6 is located within an enclosed chamber 7. Mounted above said chamber 7 is a hopper 8 for the coal. The lower end of said hopper communicates with a conduit 9 positioned adjacent to the before-mentioned conduit 5 and the coal is discharged through said conduit 9 by the rotary discharger 10, so that the coal drops onto the receiving end of the traveling belt conveyor 6 and intermingles with the heated iron bodies discharged onto said conveyor from the conduit 5. It is preferable to pulverize the coal before subjecting it to contact with the heated bodies. The belt conveyor 6 advances the mixture of coal and heated bodies across the chamber 7 and said mixture then drops from the discharge end of the belt conveyor 6 onto the receiving end of another belt conveyor 11 positioned below the belt conveyor 6. In the transfer of the material from the conveyor 6 to the conveyor 11 a further intermingling of the particles of coal with the heated bodies is effected. By the conveyor 11, the mixture of coal and heated bodies is advanced in reverse direction in the chamber 7 and is discharged from the discharge end of the conveyor 11 onto an inclined grate 12 upon which a separation of the coal from the heat transfer bodies is effected. As the mixture passes down the inclined grate 12, the coal falls through the interstices of the grate into a hopper 13 from which the distilled coal may be recovered as desired. If desired the separation of the coal from the heat transfer bodies may be assisted by vibrating the grate 12. The products of distillation discharge from the chamber 7 through the distillate outlet pipe 14. After the heat transfer bodies leave the grate 12, they pass into a conduit 15, through which they are advanced by rotary discharger 16 to the lower end of an elevator 17. The elevator lifts the heat transfer bodies so discharged and deposits them into a spout 18 through which they again pass into the upper end of the furnace 1 for further heating and further coal distillation.

By the invention, the distillation of carbonaceous material is carried on at a very rapid rate. The heat is applied to the same surfaces, from which it is subsequently transferred to the coal. The heat transfer bodies are of very cheap material and large numbers of them may be employed. Consequently the qantity of heat transfer bodies may be adequately proportioned for the distillation of any required weight of carbonaceous material and an intimate mixture of the two is economically possible. When distilling coal, the coke produced in accordance with the present invention separates readily from the surfaces of the heat transfer bodies, the troubles arising from sticking of the distilled material in low temperature distillations heretofore practiced being practically eliminated.

The invention as hereinabove set forth may be variously embodied within the scope of the claims hereinafter made.

What is claimed is:

1. The improvement in the art of distilling solid distillable carbonaceous material which consists in effecting the entire distilling operation by means of heat stored in solid heat-storing bodies by bringing the material into contact with solid heat-storing bodies constituting a heat transfer medium previously heated out of contact with the carbonaceous material undergoing treatment to a temperature great enough to effect the carbonization of the material by transfer thereto of part of its stored heat; substantially as specified.

2. The improvement in the art of distilling solid distillable carbonaceous material which consists in effecting the entire distilling operation by means of heat stored in solid heat-storing bodies by bringing the material into contact with metallic solid heat-storing bodies constituting heat transfer medium previously heated out of contact with the carbonaceous material undergoing treatment to a temperature great enough to effect the carbonization of the material by transfer thereto of part of its stored heat; substantially as specified.

3. The improvement in the art of distilling solid distillable carbonaceous material which consists in effecting the entire distilling operation by means of heat stored in solid heat-storing bodies by bringing the material into contact with an iron heat transfer means previously heated out of contact with the carbonaceous material undergoing treatment to a temperature great enough to effect the carbonization of the material by transfer thereto of part of its stored heat; substantially as specified.

4. The improvement in the art of low temperature distilling of coal which consists in storing heat in iron solid bodies, bringing the coal into contact with said bodies to effect a heat transfer therebetween and maintaining the coal in contact therewith until carbonized by such stored heat thereby distilling the coal, removing the distilled coal from said bodies, and then reheating said bodies for effecting further distillation; substantially as specified.

5. The improvement in the art of low temperature distilling of solid distillable carbonaceous material which consists in storing in iron solid bodies sufficient heat to complete the entire carbonization operation by a mere heat transfer between said bodies and the material to be distilled of stored heat, mixing the material to be distilled with the thus heated bodies, carbonizing the mixed material by a mere heat transfer thereto of stored heat from solid bodies mixed therewith, separating the distilled material from said bodies and reheating the said bodies to effect further distillation; substantially as specified.

6. The improvement in the art of heating solid distillable carbonaceous material to a final temperature which consists in effecting a heat transfer between such material and an iron body previously heated to a temperature great enough to give off approximately twice the required heat when the iron body is cooled, during the heat transfer operation, to the required final temperature of the material; substantially as specified.

7. The improvement in the art of low temperature coking of solid distillable carbonaceous material which consists in heating a solid heat-storing means constituting a heat transfer medium out of contact with material undergoing treatment to a heat great enough to effect the coking operation, and thereafter bringing the material to be coked into contact with the same heat transfer medium, and coking the same by the heat that was stored in said medium previous to its being brought into contact with said material; whereby the gases evolved in the distillation are prevented from mixing with the gases employed in heating the heat transfer medium; substantially as specified.

8. The improvement in the art of distillation of coal which consists in effecting a heat transfer between the coal and iron bodies heated to a temperature, substantially 1400° F., the weight of the iron bodies in excess of that of the coal being such that the heat stored in said iron bodies above the required temperature of the coal is approximately twice the amount required for bringing the coal to the required final temperature; substantially as specified.

9. The improvement in the art of distilling solid distillable carbonaceous material which consists in heating solid heat-transfer bodies in a furnace to store in said solid bodies the heat to effect such distillation, transferring said heat transfer bodies to a distilling chamber and in said distilling chamber admixing with them the carbonaceous material to be distilled, carbonizing said material by the heat stored in said bodies by maintaining said solid bodies and carbonaceous material in admixture until said material is carbonized mainly by heat previously stored in said bodies in said furnace; then separating the distilled carbonaceous material from the heat transfer bodies, and transferring the thus separated bodies back to the furnace for further heating; substantially as specified.

10. The improvement in the art of distilling solid distillable carbonaceous material which consists in heating solid, heat-transfer bodies in a furnace to store in said solid bodies the heat to effect such distillation, transferring said heat transfer bodies to a distilling chamber and in said distilling chamber admixing with them the carbonaceous material to be distilled, carbonizing said material by the heat stored in said bodies by maintaining said solid bodies and carbonaceous material in admixture until said material is carbonized mainly by heat previously stored in said bodies in said furnace; then separating the distilled carbonaceous material from the heat transfer bodies, transferring the thus separated bodies back to the furnace for further heating, and effecting separate discharge of the gases from the furnace and the distilling chamber; substantially as specified.

11. The improvement in the art of distilling solid distillable carbonaceous materials which consists in storing heat in solid bodies constituting a heat transfer medium, and distilling the material to effect its carbonization by stored heat by bringing it into contact and maintaining it in contact with said medium until carbonized to effect its carbonization by a heat transfer to said material of heat stored in said medium; substantially as specified.

12. The improvement in the art of carbonizing solid distillable carbonaceous materials which consists in storing heat in solid bodies constituting a heat transfer medium, and carbonizing the material by bringing it into contact and maintaining it in contact with said medium until carbonized to effect its carbonization by a heat transfer to said material of heat stored in said medium; substantially as specified.

13. The improvement in the art of carbonizing coal which consists in storing heat in solid bodies constituting a heat transfer medium, and carbonizing the coal by heat stored in said medium by effecting a transfer between it and said coal of heat stored in said medium; substantially as specified.

14. The improvement in the art of coking coal which consists in storing the heat for effecting the coking in solid bodies constituting a heat transfer medium, and effecting the entire coking operation by stored heat by causing a transfer between the coal and said medium of the coking heat stored in said medium; substantially as specified.

15. A process of distillation of solid distillable carbonaceous material, particularly for low temperature carbonization, comprising: previously heating solid bodies outside of a distilling chamber to the requisite temperature to effect carbonizing distillation in said chamber; introducing the so heated solid bodies and a charge of solid distillable carbonaceous material into the distilling chamber; imparting heat to the charge in the distilling chamber by contact of said charge with said solid bodies therein, said solid bodies being used in such volume as to effect the carbonizing distillation; and thereafter separating the solid bodies from the carbonaceous matter distilled.

In testimony whereof I have hereunto set my hand.

FRANZ PUENING.